Figure 1:
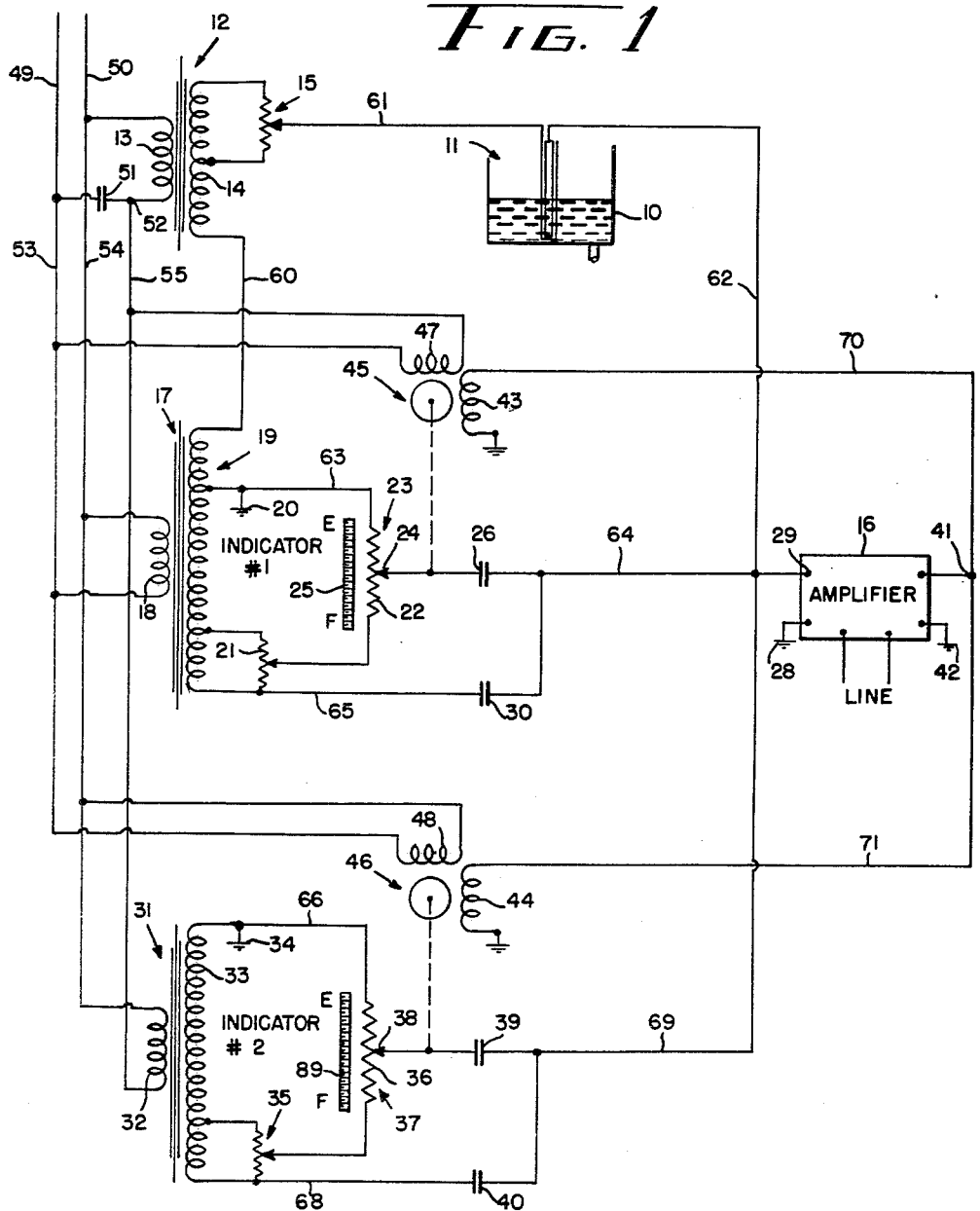

June 14, 1960

J. F. STORM ET AL 2,940,311

CONDITION SENSING APPARATUS

Filed Feb. 16, 1955

2 Sheets-Sheet 1

INVENTOR.
JOHN F. STORM
REGINALD M. WILLIAMSON
BY Frederick E. Lange

ATTORNEY

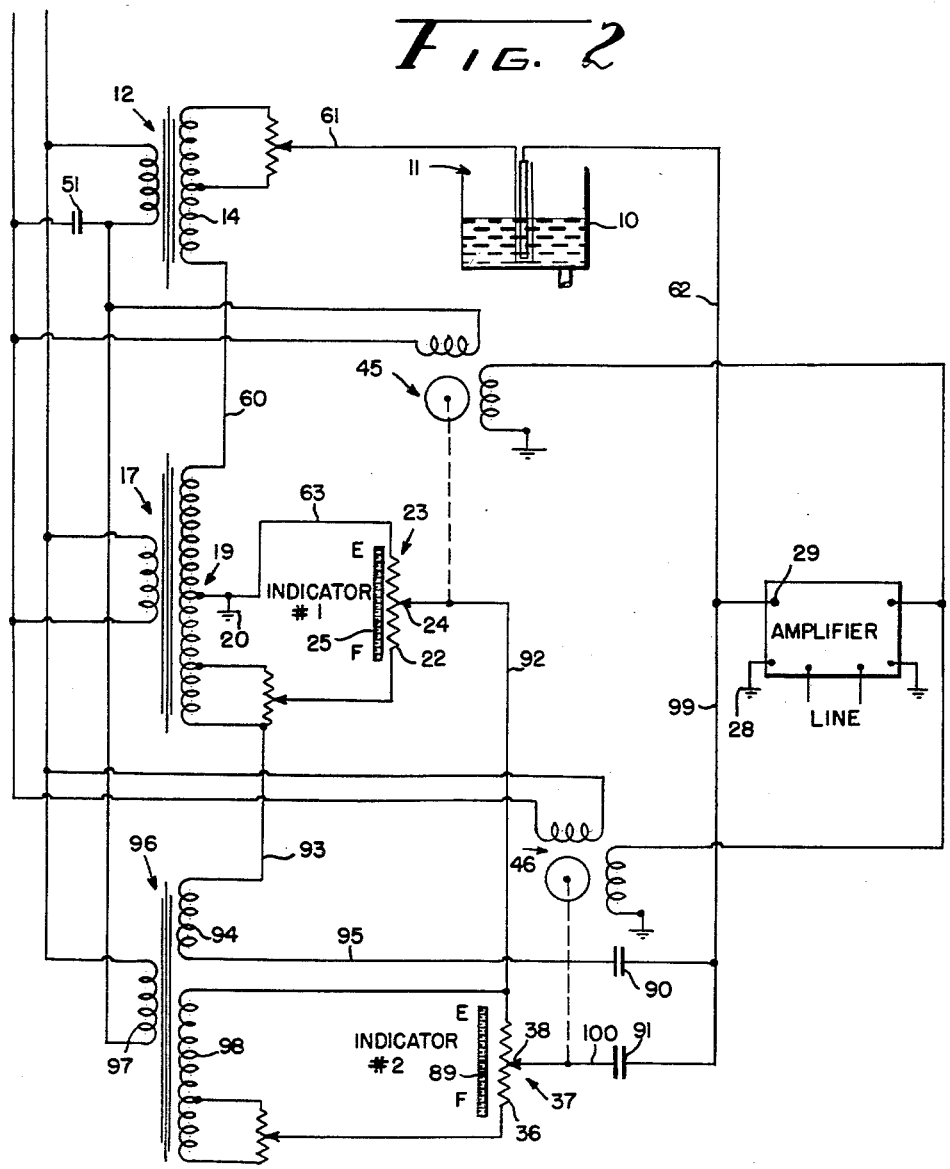

United States Patent Office 2,940,311
Patented June 14, 1960

2,940,311
CONDITION SENSING APPARATUS

John F. Storm, Minneapolis, and Reginald M. Williamson, Brooklyn Park, Minn., assignors to Minneapolis-Honeywell Regulator Company, Minneapolis, Minn., a corporation of Delaware Filed Feb. 16, 1955, Ser. No. 488,571

17 Claims. (Cl. 73—304)

The present invention is concerned with condition sensing apparatus and more particularly with a fuel quantity indicating apparatus using a capacitance type bridge to derive a plurality of signals of different characteristics and utilizing a single amplifier to amplify the plurality of signals to control a plurality of indicators, thereby providing a plurality of indications of the fuel quantity.

Prior art patents contain teachings of means whereby a single amplifier is utilized to amplify two or more signals. The present invention is founded upon this broad teaching.

With the advent of high speed long range aircraft the consideration of weight of the various control components of the aircraft has become exceedingly important. For every pound of weight which can be eliminated from a control system a valuable pound of fuel can be carried. The characteristics of an aircraft control apparatus, listed in their order of importance, could be said to be operativeness, weight, and cost.

The broad object of the present invention is to provide a motor control system whereby a single capacitance condition sensing means is utilized and arranged to derive a plurality of electrical signals, each of a different characteristic, and of a magnitude indicative of the condition being sensed, a single electronic amplifier to amplify the plurality of signals, and a plurality of signal responsive indicator means each selectively controlled by one of the plurality of signals.

It is an object of the present invention to provide an improved control apparatus for indicating the quantity of fluid in a container, which apparatus is highly operative, and eliminates a number of components to thereby provide a light weight and a relatively low cost apparatus.

It is a further object of the present invention to provide an improved liquid quantity indicating apparatus utilizing a liquid quantity sensing means connected to derive a plurality of signals of different characteristics, signal responsive means controlled by this plurality of signals, and means controlled by the signal responsive means including the plurality of indicators to derive a plurality of signals to oppose the first mentioned plurality of signals.

It is the further object of the present invention to provide an improved fuel quantity indicating apparatus utilizing a capacitance sensing means connected in a capacitance bridge having a plurality of voltage of different phase impressed thereon and having an amplifier to amplify the signals and control a plurality of rebalance means to rebalance the capacity bridge.

These and other objects of this invention will be apparent to those skilled in the art upon reference to the following specifications, claims, and drawings, of which:

Figure 1 is a schematic representation of the present invention, and Figure 2 is a schematic representation of a modification of the present invention.

Referring now to Figure 1, the numeral 10 designates a fluid storage means or tank. Tank 10 can be considered to be the fuel tank of an aircraft having mounted therein a capacitance type fuel quantity sensing means 11. The sensing means 11 may be of the type disclosed in the Earl C. Bowar Patent No. 2,560,757. It is to be noted that the sensing means 11 and the tank 10 are shown out of proportion for reasons of clarity. Sensing means 11 functions to have a certain minimum capacity when the tank 10 is empty and to have a capacitance value which increases as the tank 10 is filled.

The reference numeral 12 designates a transformer having a primary winding 13 and a secondary winding 14. A calibrating potentiometer 15 is connected across an upper portion of the secondary 14 and the movable wiper of this potentiometer is connected in circuit with the sensing means 11 to an input terminal 29 of an amplifier 16.

Amplifier 16 is a conventional linear amplifier. That is, it is an amplifier which produces at the output thereof an amplified reproduction of the signal applied to the input of the amplifier.

The reference numeral 17 designates a transformer having a primary winding 18 and a secondary winding 19, which secondary is tapped and grounded at ground connection 20. A calibrating potentiometer 21 is connected across a lower portion of the secondary 19 and the movable tap of potentiometer 21 is connected to the end terminal of a resistance element 22 of a potentiometer 23. The upper terminal of the resistance element 22 is connected to ground connection 20. Potentiometer 23 has a movable wiper 24 which cooperates with an indicator scale 25 to indicate the quantity of fuel in the tank 10.

The movable tap 24 is connected through a capacitor 26 to the input of amplifier 16.

The reference numeral 31 designates a transformer having a primary winding 32 and a secondary winding 33, the upper terminal of which is connected to ground connection 34. A calibrating potentiometer 35 is connected across a lower portion of the secondary 33 and has its movable tap connected to the lower terminal of resistance element 36 of potentiometer 37. The upper terminal of resistance element 36 is connected to ground connection 34. Potentiometer 37 has a movable tap 38 which cooperates with an indicator scale 89 to also provide an indication of the quantity of fuel in the tank 10. The movable tap 38 is connected through a capacitor 39 to the input of amplifier 16.

The output of amplifier 16 is applied between terminal 41 and ground connection 42. Terminal 41 is connected to the control windings 43 and 44 of two-phase motors 45 and 46 respectively. The reference numerals 47 and 48 designate the line voltage windings of the two-phase motors 45 and 46.

Electrical power is supplied to the apparatus by means of power line conductors 49 and 50, which are connected to a source of alternating current voltage not shown. The primary winding 13 of transformer 12 is connected directly to the power line conductor 50 and through capacitor 51 to the power line conductor 49. Capacitor 51 is a phase shifting capacitor and serves to shift the phase of the voltage which is applied to primary 13. A terminal 52 is provided and from this terminal a conductor 55 is extended. Conductors 53 and 54 are extended from conductors 49 and 50 respectively and from this arrangement, including phase shifting capacitor 51, it can be seen that the voltage between the conductors 54 and 55 is 90° out of phase with respect to the voltage between conductors 53 and 54.

The primary 18 of transformer 17 is connected directly to conductors 53 and 54 as is the line voltage winding 48 of the two-phase motor 46.

The primary winding 32 of transformer 31 is connected to conductors 54 and 55, as is the line voltage winding 47 of two-phase motor 45. For this it can be seen that the voltage applied to primary 18 and winding 48 is 90° out of phase with respect to the voltage applied to primary 32 and line voltage winding 47.

The concept involved in this invention is to provide a signal voltage of one phase and a signal voltage of a 90° phase indicative of the quantity of fuel in the tank 10 and to rebalance each of these signals individually by means of two motors which are sensitive to one or the other of the signals to provide dual indication of the quantity of fuel in the tank 10. Such dual indication is of great importance in aircraft and of particular importance in the larger aircraft where an indication of fuel quantity must be had at a plurality of remotely located positions within the aircraft.

The operation of Figure 1 will now be described. Tank 10 has been shown approximately half full of fluid. With the apparatus at balance, the potentiometer taps 24 and 38 indicate one-half full on the indicator scale 25 and 89 respectively.

The electrical signals or currents which are applied to the input terminal 29 of amplifier 16 will now be considered.

A first circuit can be traced from ground connection 20 through the upper portion of secondary 19, conductor 60, secondary 14, conductor 61, sensing means 11, conductor 62, input terminal 29 of amplifier 16, and ground connection 28. In this circuit it can be seen that the voltage across the upper portion of secondary 19 is of the line voltage phase, whereas the voltage on secondary 14 is shifted 90° with respect thereto by means of the phase shifting capacitor 51 in the primary circuit of transformer 12. Therefore, in this above traced circuit a current flows which has a first component and a second component displaced 90° from the first component. The magnitude of each of these two components is determined by the quantity of fuel in the tank 10, which determines the capacitance of the sensing means 11.

A second circuit can be traced from ground connection 20 through conductor 63, the upper portion of resistance element 22, movable tap 24, capacitor 26, conductor 64, input terminal 29 of amplifier 16 and ground connection 28. The voltage on potentiometer tap 24 is the voltage applied to the secondary 19 of transformer 17. However, the voltage on tap 24 is 180° displaced from the voltage across the upper portion of secondary 19, which upper portion is included in the first above traced circuit. This is due to the fact that the upper portion of transformer secondary 19 lies above connection 20 while the portion of secondary 19 to which the potentiometer 23 is connected receives its voltage from that portion of secondary 19 which is below the ground connection 20. Therefore, the current flowing through the capacitotr 26 is 180° out of phase with that portion of the current flowing through the sensing element 11 due to the upper portion of secondary 19. By adjustment of the potentiometer tap 24 this current flow is made equal and opposite to the current flow through the sensing element 11, and in this manner the current of this particular phase applied to the input of amplifier 16 is reduced substantially to zero. The exact manner of rebalancing will be described later.

A third circuit can be traced from ground connection 20 through the lower portion of secondary 19, conductor 65, capacitor 30, conductor 64, input terminal 29 of amplifier 16, and ground connection 28. It can be seen that in this circuit a fixed voltage supply and a fixed capacitor 30 are provided. This capacitor can be called the empty tank reference capacitor and its function is to provide a signal which is 180° out of phase and equal in magnitude to the signal supplied from sensing means 11 which is due to the upper portion of secondary 19, and which is due to the empty tank capacitance of sensing means 11. In other words, the sensing means 11 has a certain minimum capacity when there is no fuel in the tank 10. It is the function of capacitor 30 in this last traced circuit to provide a current which balances out the current from sensing element 11 under this condition.

A fourth circuit can be traced to the input of amplifier 16 from ground connection 34 through conductor 66, the upper portion of the resistance element 36 of potentiometer 37, potentiometer wiper 38, capacitor 39, conductor 69, input terminal 29 of amplifier 16 and ground connection 28. It will be remembered that the primary 32 of transformer 31 is connected so as to have a voltage applied thereto which is 90° displaced from the line voltage. Since this is true, and since the upper terminal of secondary 33 is grounded at ground connection 34, the voltage on the potentiometer tap 38 is 180° out of phase with the voltage supplied in the first above traced circuit due to transformer secondary 14. By proper adjustment of the potentiometer tap 38 the current flowing through capacitor 39 is made equal and opposite to the current flowing through sensing element 11 due to the voltage of secondary 14. The exact manner in which potentiometer tap 38 is adjusted to perform this function will be later described.

A fifth circuit can be traced from ground connection 34 through secondary 33, conductor 68, capacitor 40, conductor 69, amplifier input terminal 29, and ground connection 28. The current flowing through capacitor 40 is likewise 180° out of phase with the current flowing through sensing element 11 due to the voltage of the secondary 14. As with capacitor 30, capacitor 40 can be called an empty tank reference capacitor and serves the function of providing an electrical current in the input of amplifier 16 which balances out the current from sensing element 11 which is due to secondary 14 and which is due to the empty tank capacitance of sensing means 11.

The above described electrical voltages or currents are applied to the input of amplifier 16 and since amplifier 16 is a linear amplifier, the output of the amplifier is a true amplified reproduction of these input voltages or currents. Terminal 41 is connected by means of a conductor 70 to the control winding 43 of motor 45 and by means of a conductor 71 to the control winding 44 of the second motor 46. Since the line voltage windings 48 and 47 of the motors 46 and 45 respectively are connected directly to the line voltage and directly to the voltage which is displaced 90° by means of the phase-shifting capacitor 51, the respective motors 46 and 45 are sensitive to the 90° shifted signal and to the line voltage signal respectively.

The motors 45 and 46 are operative to control the position of potentiometer taps 24 and 38 respectively and to cause the input current to amplifier 16 to be reduced substantially to zero since the movement of the respective potentiometer taps tend to reduce the signal which is effective in the output of amplifier 16 to have originally caused movement of the potentiometer tap. In other words, when the level of fuel in the tank 10 decreases the capacitance value of the sensing element 11 decreases and the current flowing through sensing element 11, which is made up of the two components, likewise decreases. This causes an unbalance to occur in the input of amplifier 16. Therefore, two currents, displaced by 90°, flow through the windings 43 and 44 of motors 45 and 46 respectively. One of these currents is in phase with the line voltage, that is the voltage between conductors 49 and 50, whereas the other current is 90° displaced therefrom. Since the line voltage winding 48 of motor 46 is connected to conductor 49 and 50, motor 46 will be affected by the 90° displaced current to position tap 38. The positioning of this tap reduces the magnitude of the 90° current and motor 46 stops when this component has been reduced to zero. In a like manner, motor 45 is effected by the in phase component to position tap 24 to thereby reduce the magnitude of the in phase current to zero. The motors 45 and 46 move the potentiometer wipers 24 and 38 in an upward direction to thereby reduce the voltage applied to the capacitors 26 and 39 and once again reduce the current flowing in the input of amplifier 16 substantially to zero. The potentiometer taps 24 and 38 cooperating with the indicator scales 25 and 89 indicate the new quantity of fuel in the tank 10.

The modification of Figure 2 is a modification whereby a single empty tank reference capacitor 90 and a single capacitor 91 are provided in place of the capacitors 26, 30, 39, and 40 of Figure 1. A majority of components of Figure 2 are similar to the components of Figure 1 and like reference numerals have been retained.

As in Figure 1, a first circuit can be traced in Figure 2 from ground terminal 20 through the upper portion of secondary 19, conductor 60, secondary 14, conductor 61, sensing means 11, conductor 62, input terminal 29 of amplifier 16, and ground terminal 28. The current flowing in this circuit is made up of a first and a second component, the components being displaced 90°. The magnitude of these components is a function of the quantity of fuel in the tank 10.

A second circuit can be traced from ground terminal 20 through the lower portion of secondary 19, conductor 93, secondary 94, conductor 95, capacitor 90, conductor 99, input terminal 29 of amplifier 16, and ground connection 28. It can be seen that in this circuit a current flows which has two components displaced 90°. The voltages in this circuit are constant and the capacitor 90 is of a constant value. Capacitor 90 is an empty tank reference capacitor and this capacitor along with the secondary 94 and the bottom portion of secondary 19 serve to balance out the current from sensing element 11 when the tank 10 is empty.

A third circuit can be traced from ground terminal 20 through conductor 63, the upper portion of the resistance 22 of potentiometer 23, tap 24, conductor 92, the upper portion of the resistance element 36 of potentiometer 37, tap 38, conductor 100, capacitor 91, conductor 99, input terminal 29 of amplifier 16, and ground terminal 28. In this circuit it can be seen that there are two variable sources of voltage whose magnitude is determined by the position of potentiometer taps 24 and 38 respectively. The function of this circuit is to provide a current flow through the capacitor 91 which is equal and opposite to the current flow through the sensing means 11 due to fuel in the tank 10.

The two-phase motors 45 and 46 are provided to position the taps 24 and 38 respectively and to bring the apparatus into balance such that the current flow through the capacitor 91 is equal and opposite to the flow through sensing means 11 due to fuel in the tank 10. The motors 45 and 46 are controlled in the manner above described with respect to Figure 1 and the position of taps 24 and 38 cooperate with the indicator scales 25 and 89 respectively to provide a dual indication of the quantity of fuel in the tank 10.

From the above description it can be seen that an improved control apparatus has been provided whereby an accurate, low weight, and relatively low cost fuel quantity indicating apparatus is provided. These and other modifications of the present invention will be apparent to those skilled in the art and it is intended that the scope of the present invention be limited solely by the appended claims.

We claim as our invention:

1. Fluid quantity measuring apparatus for use with a fluid container for indicating at a plurality of points the quantity of fluid in the container, comprising; fluid quantity sensing means arranged to be disposed in the container to sense the quantity of fluid therein, means including said sensing means arranged to derive an electrical signal having a plurality of components which vary in magnitude with the quantity of fluid in the container, each of said components having a different electrical sense an electrical signal responsive means having an input, means connecting said first named means to the input of said signal responsive means to apply said signal thereto, said signal responsive means having an output signal including the input signal components, a plurality of electrical means connected to the output of said signal responsive means, each of said electrical means being responsive to only one of said plurality of components of said signal and each of said electrical means including means to derive a signal having a component of variable magnitude and of a sense to oppose the sense of one of said first named plurality of components, means connecting said electrical means to the input of said signal responsive means to cause the signal at said input to be reduced substantially to zero, and a plurality of indicator means, one of which is associated with each of said electrical means, arranged to provide a plurality of indications of the quantity of fluid in the container.

2. Fluid quantity sensing apparatus for use with a fluid container for providing a plurality of indications of the quantity of fluid in the container, comprising; fluid quantity sensing impedence means arranged to be positioned in the container to sense the quantity of fluid therein, a plurality of electrical voltage sources each having a different electrical characteristic independent of the magnitude thereof, means connecting said plurality of sources to said sensing means to derive a plurality of electrical currents of different electrical characteristics and of magnitude dependent upon the quantity of fluid in the container, an electrical current responsive means having an input circuit, and an output signal which includes the distinguishing input signal characteristics, means connecting said input circuit to said first named means to cause said plurality of electrical currents to be impressed thereon, output means connected to and controlled by said current responsive means, said output means including a plurality of voltage means to derive a plurality of electrical currents of an opposite sense to and of a magnitude dependent upon the input signal applied to said current responsive means, circuit means connecting said output means to said input circuit to cause the input current to be reduced substantially to zero, and a plurality of indicating means controlled by said output means to indicate the quantity of fluid in the container.

3. Fuel quantity indicating apparatus for use with fuel storage means for indicating at a plurality of points the quantity of fuel in the storage means, comprising; impedance type fuel quantity sensing means arranged to be disposed in the fuel storage means, a first plurality of alternating current voltage sources each of a different phase, circuit means connecting said sensing means to said first plurality of voltage sources to derive a plurality of signal voltages of said different phases and of a magnitude dependent upon the quantity of fuel in the storage means, an electronic amplifier having an input and an output, means connecting said circuit means to said amplifier input to apply said plurality of signal voltages thereto, a plurality of motor means connected to said amplifier output and arranged so that each motor means is selectively sensitive to one of said signal voltages of said different phases, a second plurality of alternating current voltage sources each of a different phase and each source being of an opposite phase to one of said first plurality of voltage sources, means connecting said plurality of motor means to said second plurality of voltage sources so that each of said plurality of motor means controls the magnitude of the one said second voltage source which is of a phase opposite to the phase to which it is sensitive, means connecting said second plurality of voltage sources to said amplifier input, and an indicator associated with each of said plurality of motor means to indicate the quantity of fuel in the storage means.

4. Liquid quantity indicating apparatus for use with a liquid container for indicating at a plurality of points the quantity of liquid in the container, comprising; an electrical signal responsive means having an input and providing an output signal which includes the distinguishing characteristics of a signal applied to the input, a plurality of output means connected to said signal responsive means which are selectively sensitive to electrical signals having different characteristics which are independent of the magnitude thereof, means including liquid quantity sensing means connected to said input to apply thereto a plurality of electrical signals having said different characteristics and of a magnitude dependent upon the quantity of liquid in the container, a plurality of electrical signal sources each one of which has an output signal of an opposite sense to one of the signals applied to said input and of a magnitude which is controlled by one of said plurality of output means, means connecting said plurality of signal sources to said input, and a plurality of liquid quantity indicators controlled one by each of said plurality of output means.

5. Liquid quantity indicating apparatus for indicating liquid quantity at two points comprising; a first source of voltage of a first phase, a second source of voltage of a second phase, impedance type liquid quantity sensing means connected to said sources of voltage to derive signal currents of said first and second phase, an amplifier means having an input connected to said sensing means, a first and a second two-phase motor with the line voltage winding of the first motor connected to said first source of voltage and the line voltage winding of the second motor connected to said second source of voltage, means connecting the control winding of both of said motors to the output of said amplifier, a third source of voltage of a phase opposite to said first phase, a fourth source of voltage of a phase opposite to said second phase, means connecting said first motor to control the magnitude of said third source of voltage, means connecting said second motor to control the magnitude of said fourth source of voltage, means connecting said third and fourth sources of voltage to said amplifier input, and a first and second liquid quantity indicator controlled by said first and second motors respectively.

6. Liquid quantity measuring apparatus comprising; a first, second, and a third transformer, means connecting the primary of said first transformer to a voltage source of a first phase, means connecting the primaries of said second and third transformer to a voltage source of a second phase, capacitance type liquid quantity sensing means, an amplifier means having an input and an output, circuit means connecting the secondaries of said first and second transformers in circuit with said sensing means to the input of said amplifier, a first potentiometer connected to the secondary of said first transformer in such a manner as to have a voltage on the tap thereof of a phase opposite to said first phase, liquid quantity indicating means associated with said first potentiometer, a second potentiometer connected to the secondary of said third transformer in such a manner as to have a voltage on the tap thereof of a phase opposite to said second phase, liquid quantity indicating means associated with said second potentiometer, drive means connected to said amplifier output and arranged to control the position of the taps of said first and second potentiometer in accordance with the magnitude of the signals of said first or said opposite phase and said second or said opposite phase respectively, a first and a second capacitor, circuit means connecting said first potentiometer tap and said first capacitor in series to said amplifier input, and further circuit means connecting said second potentiometer tap and said second capacitor in series to said amplifier input.

7. Liquid quantity measuring apparatus comprising; a first, second, and a third transformer, means connecting the primary of said first transformer to a voltage source of a first phase, means connecting the primaries of said second and third transformers to a voltage source of a second phase, capacitance type liquid quantity sensing means, an amplifier means having an input and an output, circuit means connecting the secondary of said first and second transformer in circuit with said sensing means to the input of said amplifier, a first potentiometer connected to the secondary of said first transformer in a manner to have a voltage on the tap thereof of a phase opposite to said first phase, liquid quantity indicating means associated with said first potentiometer, a second potentiometer connected to the secondary of said third transformer in a manner to have a voltage on the tap thereof of a phase opposite to said second phase, liquid quantity indicating means associated with said second potentiometer, drive means connected to said amplifier output and arranged to control the position of the taps of said first and second potentiometer in accordance with the magnitude of the signals of said first or said opposite phase and said second or said opposite phase, circuit means connecting the tap of said first potentiometer to said second potentiometer in a manner so that the voltage on the tap of said second potentiometer is the sum of the voltages on the two taps, a capacitor, and circuit means connecting said second potentiometer tap and said capacitor to said amplifier input.

8. Liquid quantity measuring apparatus comprising; a first transformer having a primary winding and a secondary winding having a tap connected to a reference potential, a second transformer having a primary winding and a secondary winding, a third transformer having a primary winding and a secondary winding, means connecting said first transformer primary winding to a voltage source of a first phase, means connecting said second and third transformer primary windings to a voltage source of a second phase, capacitance type liquid quantity sensing means, an amplifier means having an input and an output, said amplifier input comprising a first and a second terminal the second of which is connected to the reference potential, circuit means connecting one end terminal of said first transformer secondary in series with said second transformer secondary and said sensing means to said first input terminal of said amplifier, a first potentiometer having a resistance element and a movable tap with the resistance element connected one end to the reference potential and the other end to the other end terminal of said first transformer secondary, liquid quantity indicating means associated with said first potentiometer tap, a second potentiometer having a resistance and a movable tap with the resistance element connected to said third transformer secondary, liquid quantity indicating means associated with said second potentiometer tap, means connecting an end terminal of said third transformer secondary to the reference potential, drive means connected to said amplifier output and arranged to control the position of the taps of said first and second potentiometer respectively in accordance with the magnitude of the signals of said first or opposite phase and said second or opposite phase, a first and a second capacitor, circuit means connecting said first potentiometer tap and said first capacitor in series to said first terminal of said amplifier input, further circuit means connecting said second potentiometer tap and said second capacitor in a series circuit to said first terminal of said amplifier input, and capacitance impedance means connected to said first and third transformer secondaries and to said first input terminal of said amplifier input to apply signals to said input of a phase opposite to said first and second phase and of a magnitude to balance out the empty signal derived from said capacitance type sensing means.

9. Liquid quantity measuring apparatus comprising a first transformer having a primary winding and a secondary winding having a tap connected to a reference potential, a second transformer having a primary winding and a secondary winding, a third transformer having a primary winding and a first and a second secondary winding, means connecting said first transformer primary winding to a voltage source of a first phase, means connecting said second and third transformer primary windings to a voltage source of a second phase, capacitance type liquid quantity sensing means, an amplifier means having an input and an output, the input of said amplifier comprising a first and a second terminal with the second terminal thereof connected to the reference potential, circuit means connecting one end terminal of said first transformer secondary winding in series with the second transformer secondary winding and said sensing means to said first input terminal of said amplifier, a first potentiometer having a movable tap and a resistance element with one end terminal thereof connected to the reference potential and the other end terminal connected to the other end terminal of said first transformer secondary winding, liquid quantity indicating means associated with said first potentiometer tap, a second potentiometer having a movable tap and a resistance element connected to the first secondary winding of said third transformer, liquid quantity indicating means associated with said second potentiometer tap, drive means connected to said amplifier output and arranged to control the position of the taps of said first and second potentiometer respectively in accordance with the magnitude of the signals of the first or opposite phase and the signal of said second or opposite phase, circuit means connecting the tap of said first potentiometer to an end terminal of said second potentiometer in a manner to cause the voltage on the tap of said second potentiometer to be the sum of the voltages on the taps of said first and second potentiometer, a capacitor, circuit means connecting said second potentiometer tap in series with said capacitor to said first amplifier input terminnal, and capacitance impedance means connected to said first transformer secondary winding and the second secondary winding of said third transformer and to said amplifier input to apply signals to said amplifier input terminal, and capacitance impedance means and of a magnitude to balance out the empty signal from said capacitance type sensing means.

10. Indicating apparatus comprising; a capacity bridge having capacitance condition sensing means connected in one leg of a first branch thereof, a capacitor connected in an adjacent leg of said first branch, a first alternating current voltage source, having a component of a first phase and a component of a second phase in the leg in series with said sensing means located in a second branch of said bridge, and a second alternating current voltage source of the first phase in the leg in series with said capacitor located in the second branch of said bridge; an amplifier having an input connected in the detecting leg of the bridge, means controlled by the output of said amplifier and connected to said second voltage source to cause rebalance of the voltage of the first phase, and further means including second means controlled by the output of said amplifier connected to said amplifier input to cause rebalance of the voltage of the second phase.

11. Condition sensing apparatus for providing a plurality of indications of a condition, comprising; condition sensing impedance means, a plurality of electrical voltage sources each having a different electrical characteristic independent of the magnitude thereof, means connecting said plurality of sources to said sensing means to derive a plurality of electrical currents each having a different electrical characteristic and of a magnitude dependent upon the condition sensed by said sensing means, an electrical current responsive means having an input circuit and providing an output signal which includes the distinguishing characteristics of a signal applied to the input, means connecting said input circuit to said first named means to cause said plurality of electrical currents to be impressed thereon, output means connected to and controlled by said current responsive means, said output means including a plurality of voltage means to derive a plurality of electrical currents of an opposite sense to and of a magnitude dependent upon the input signal applied to said current responsive means, circuit means connecting said output means to said input circuit to cause the input current to be reduced substantially to zero, and a plurality of means controlled by said output means in accordance with the magnitude of the condition.

12. Condition sensing apparatus, comprising; an electrical signal responsive means having an input and providing an output signal having the distinguishing charactertistics of a signal applied to the input, a plurality of output means connected to said signal responsive means which are selectively sensitive to electrical signals of different characteristics which are independent of the magnitude thereof, means including condition sensing means connected to said input to apply thereto a plurality of electrical signals each possessing a different one of said characteristics and of a magnitude dependent upon the magnitude of a condition, a plurality of electrical signal sources each one of which has an electrical output signal of an opposite sense to one of the signals applied to said input and of a magnitude which is controlled by one of said plurality of output means, means connecting said plurality of signal sources to said input, and a plurality of means controlled one by each of said plurality of output means.

13. Liquid quantity indicating apparatus for use with a liquid container for indicating at a plurality of points the quantity of liquid in the container, comprising; capacitance means arranged to be positioned in the container and having a minimum capacitance when the container is empty and a capacitance which increases to a maximum as the container is filled with liquid, a source of voltage having a first and a second component of different characteristics independent of magnitude, an amplifier having an input and an output, means connecting said amplifier input, said capacitance means and said source of voltage in a series circuit to apply an electrical current to said amplifier input which has a first and a second component each having one of said different characteristics indepedent of magnitude, both of which components are indicative of the quantity of liquid in the container, and a first and a second indicator connected to said amplifier output and each selectively responsive to the first and second component of current respectively to provide dual indication of the quantity of liquid in the container.

14. Liquid quantity indicating apparatus for use with a liquid container for indicating at a plurality of points the quantity of liquid in the container, comprising; capacitance means arranged to be positioned in the container and having a minimum capacitance when the container is empty and a capacitance which increases to a maximum as the container is filled with liquid, a source of voltage having a first and a second component of different characteristics independent of magnitude, an amplifier having an input and an output, means connecting said amplifier input, said capacitance means and said source of voltage in a series circuit to apply an electrical current to said amplifier input which has a first and a second component each having one of said different characteristics independent of magnitude, both of which components are indicative of the quantity of liquid in the container, further capacitance means including a second source of voltage connected to said amplifier input in a manner to apply an electrical current to said amplifier input having a first and second component opposite to said first named first and second components of current and of a magnitude equal to the current from said first named capacitance means when the container is empty, and a first and a second indicator connected to said amplifier output and each selectively responsive to the first and second component of current respectively to provide dual indication of the quantity of liquid in the container.

15. In a fuel gaging system: a plurality of voltage sources, at least one of which produces a voltage having a first electrical characteristic and at least another of which sources produces a voltage having a second electrical characteristic which is capable of being discriminated from the said first characteristic; a plurality of rebalanceable electric circuits; means connecting said voltage sources to said circuits; condition sensing means connected in said circuits and capable of deriving signals of said first and second characteristics and of magnitude indicative of the condition being sensed; first rebalance means connected in said circuits responsive only to signals of said first characteristic and capable of deriving a voltage of variable magnitude and of sense opposite to said first characteristic; and second rebalance means connected in said circuits responsive only to signals of said second characteristic and capable of deriving a voltage of variable magnitude and of sense opposite to said second characteristic, said first and second rebalance means operative to null the effect of the signals from said condition sensing means.

16. In combination: a plurality of voltage sources at least one of which produces a voltage having a first electrical characteristic and at least another of which produces a voltage having a second electrical characteristic which is capable of being discriminated from said first characteristics; a plurality of rebalanceable electric circuits; means connecting said voltage sources to said electric circuits; liquid containing means; liquid level sensing means associated with said liquid contaning means; means connecting said sensing means in said electric circuits so that said sensing means produces signals of said first and second characteristic and of magnitude indicative of the quantity of liquid in said containing means; means responsive only to signals of said first characteristic and capable of producing signals of sense opposite said first characteristic; means connecting said last named means in said electric circuits to null the signal of said first characteristic produced by said sensing means; means responsive only to signals of said second characteristic and capable of producing signals of sense opposite said second characteristic; and means connecting said last named means in said electrical circuits to null the signal of said second characteristic produced by said sensing means.

17. Control apparatus for use with a liquid containing means comprising; impedance type liquid quantity sensing means arranged to be located in the containing means and having an impedance value which varies as a function of a quantity of liquid in the containing means, a source of alternating voltage of a first electrical characteristic, current responsive means, circuit means connecting said liquid quantity sensing means to said first source of voltage and to said current responsive means to cause an electrical current to flow to said current responsive means which is of said first characteristic and of a magnitude indicative of a quantity of liquid in the containing means, a second source of voltage of a second electrical characteristic, circuit means connecting said liquid quantity sensing means to said second voltage source and said current responsive means to cause an electrical current to flow to said current responsive means which is of said second characteristic and of a magnitude which varies as a function of a quantity of liquid in the containing means, and further means including a first portion responsive only to currents of said first characteristic and a second portion responsive only to currents of said second characteristic conneced to be controlled by said current responsive means each said portion being operable to provide an electrical signal in accordance with the quantity of liquid in the containing means.

References Cited in the file of this patent
UNITED STATES PATENTS

| | | |
|---|---|---|
| 2,563,280 | Schafer | Aug. 7, 1951 |
| 2,650,496 | Middleton | Sept. 1, 1953 |
| 2,729,097 | Cherrier | Jan. 3, 1956 |